(12) United States Patent  
Weigmann et al.

(10) Patent No.: US 11,697,146 B2  
(45) Date of Patent: Jul. 11, 2023

(54) BENDING DEVICE HAVING WORKPIECE GUIDANCE BY A MULTI-ARTICULATED ARM ROBOT

(71) Applicant: WAFIOS Aktiengesellschaft, Reutlingen (DE)

(72) Inventors: Uwe-Peter Weigmann, Nuertingen (DE); Thomas Walker, Reutlingen (DE)

(73) Assignee: WAFIOS Aktiengesellschaft, Reutlingen (DE)

( * ) Notice: Subject to any disclaimer, the term of this patent is extended or adjusted under 35 U.S.C. 154(b) by 0 days.

(21) Appl. No.: 17/047,328

(22) PCT Filed: Apr. 12, 2019

(86) PCT No.: PCT/EP2019/059559  
§ 371 (c)(1),  
(2) Date: Oct. 13, 2020

(87) PCT Pub. No.: WO2019/197669  
PCT Pub. Date: Oct. 17, 2019

(65) Prior Publication Data  
US 2021/0162484 A1    Jun. 3, 2021

(30) Foreign Application Priority Data  
Apr. 13, 2018    (DE) .................... 10 2018 108 862.0

(51) Int. Cl.  
*B21D 43/10*    (2006.01)  
*B21D 7/02*    (2006.01)  
(Continued)

(52) U.S. Cl.  
CPC ............. *B21D 43/105* (2013.01); *B21D 7/02* (2013.01); *B21D 7/12* (2013.01); *B25J 3/00* (2013.01); *B25J 9/06* (2013.01)

(58) Field of Classification Search  
CPC . B21D 7/02; B21D 7/12; B21D 43/105; B25J 3/00; B25J 9/06  
See application file for complete search history.

(56) References Cited

U.S. PATENT DOCUMENTS

| 3,431,759 A | | 3/1969 | Kidera et al. |
| 5,287,433 A | * | 2/1994 | Prunotto .............. B21D 43/105 |
| | | | 72/422 |

(Continued)

FOREIGN PATENT DOCUMENTS

| CN | 104815884 A | 8/2018 |
| DE | 330106 A1 | 12/1920 |

(Continued)

OTHER PUBLICATIONS

Product website for KUKA, accessed at <https://www.kuka.com/en-de/products/robot-systems/software/application-software/kuka_cnc> Oct. 8, 2020, KUKA Deutschland GmbH Sales, Zugspitzstraße 140, 86165 Augsburg, Germany, 6 pgs.

(Continued)

*Primary Examiner* — Teresa M Ekiert  
(74) *Attorney, Agent, or Firm* — Bradley J. Thorson

(57) ABSTRACT

The invention relates to a bending device (2) for bending a rod-like or tubular workpiece (4), comprising a bending machine (6), which has a bending head (8), which is designed for bending the workpiece (4) in a forming process, and a control means (24), which controls the operation of the bending machine (6), a robot (10), which comprises a multi-joint arm (11) which can be adjusted by motors, having a gripper end (12), which is designed for gripping and holding the workpiece (4), and a control unit (22), which is designed to control the operation of the robot (10), wherein the control means (24) is designed to control the bending machine (6) and the robot (10) during the bending process. The control unit (22) of the robot (10) is switched, (Continued)

at least during the bending process, to a slave mode in which it receives control commands from the control means (24) of the bending machine (6), and the control means (24) of the bending machine (6), during the bending process, continuously issues setting specifications for the motor-adjustable multi-joint arm (11) and the gripper end (12) to the control unit (22) of the robot (10) which has been switched to slave mode and thereby controls the robot (10) to introduce the workpiece (4) into the bending head (8), to stabilize the workpiece during the forming process and to remove the workpiece from the bending head (8) after the forming process.

16 Claims, 2 Drawing Sheets

(51) Int. Cl.
  *B21D 7/12* (2006.01)
  *B25J 3/00* (2006.01)
  *B25J 9/06* (2006.01)

(56) References Cited

U.S. PATENT DOCUMENTS

| | | | |
|---|---|---|---|
| 5,291,771 A | 3/1994 | Tomo et al. | |
| 2006/0254336 A1 | 11/2006 | Rosenberger | |
| 2007/0199361 A1 | 8/2007 | Yogo | |
| 2009/0177306 A1* | 7/2009 | Bosga | B21D 43/02 901/6 |
| 2010/0307214 A1 | 12/2010 | Yogo | |
| 2015/0352619 A1 | 12/2015 | Yogo et al. | |
| 2016/0257002 A1* | 9/2016 | Takayama | B25J 9/1664 |
| 2016/0311086 A1 | 10/2016 | Christofilis et al. | |
| 2018/0050375 A1 | 2/2018 | Yogo et al. | |

FOREIGN PATENT DOCUMENTS

| | | |
|---|---|---|
| DE | 554533 T2 | 3/1994 |
| DE | 69208243 T | 7/1996 |
| DE | 69616865 T2 | 6/2002 |
| DE | 202015100467 U1 | 2/2015 |
| DE | 102016205048 B3 | 7/2017 |
| DE | 102018108863 U1 | 10/2019 |
| EP | 0554533 B1 | 8/1993 |
| EP | 0742054 A1 | 11/1996 |
| EP | 1651367 B1 | 5/2006 |
| EP | 1810762 A1 | 7/2007 |
| EP | 2243568 A1 | 10/2010 |
| EP | 2998041 A1 | 3/2016 |
| EP | 3266529 A1 | 1/2018 |
| FR | 2914203 A1 | 10/2008 |
| JP | H05212450 A | 8/1993 |

OTHER PUBLICATIONS

Industry online support and Product support for SINUMERIK Run MyRobot /Handling, accessed at <https://support.industry.siemens.com/cs/document/67701073/sinumerik-run-myrobothandling?dti=0&dl=en&lc=de-WW> Oct. 8, 2020, registered copyright Siemens AG 2009-2020, 2 pgs.

Product information forTF5120 | TC3 Robotics mxAutomation, accessed at <https://www.beckhoff.de/default.asp?twincat/tf5120.htm> Oct. 8, 2020, registered copyright Beckhoff Automation 2019, 1 pg.

Product information for KUKA.PLC mxAutomation, accessed at <https://www.kuka.com/en-de/products/robot-systems/software/hub-technologies/kuka,-d-,plc-mxautomation> Oct. 8, 2020, KUKA Deutschland GmbH Sales, Zugspitzstraße 140, 86165 Augsburg, Germany, 6 pgs.

Product information for TF5130 | TC3 Robotics uniVAL PLC, accessed at <https://www.beckhoff.de/TF5130/> Oct. 8, 2020, registered copyright Beckhoff Automation 2019, 1 pg.

Product website for Staubli Unival Drive, accessed at <https://www.unival-drive.com/> Oct. 8, 2020, last updated: Updated May 24, 2018, Copyright Stäubli, 2007-2020, Stäubli International AG, Corporate Communications, PO Box 30, CH-8808 Pfäffikon / Switzerland, (2) pgs.

Perfection in Automation, Company Press Room, "The easy integration of Stäubli robots using uniVAL drives and POWERLINK networks," accessed at <https://www.br-automation.com/en/about-us/press-room/the-easy-integration-of-staeubli-robots-using-unival-drives-and-powerlink-networks-03-03-2011/> Oct. 8, 2020, published Mar. 3, 2011, B&R Industrial Automation GmbH , B&R Straße, 5142 Eggelsberg, Austria, 4 pgs.

Product website for Eaton Leonard, specifcally for CNC Tube Benders "Tulip/ Roboflex Bending Cell," accessed at <http://claudiafaulk.com/EL_Site/mainpages/Tulip_Roboflex.html> Oct. 8, 2020, Eaton Leonard, 1391 Specialty Drive, Vista, CA 92081, Registered Copyright 2011, 1 pg.

* cited by examiner

BENDING DEVICE HAVING WORKPIECE GUIDANCE BY A MULTI-ARTICULATED ARM ROBOT

RELATED APPLICATIONS

The present application claims priority to PCT Application No. PCT/EP2019/059559, entitled BENDING DEVICE HAVING WORKPIECE GUIDANCE BY A MULTI-ARTICULATED ARM ROBOT, filed Apr. 12, 20219, and claims the benefit of German Application No. 102018108862.0, filed Apr. 13, 2018, which are both hereby incorporated herein by reference in their entirety.

FIELD OF THE INVENTION

The invention relates to a bending apparatus for bending a workpiece, the apparatus comprising a bending machine comprising a bending device adapted to bend the workpiece in a working process, and a control device, which controls the operation of the bending machine, and having a robot having a gripping end adapted to grip and hold the workpiece, and a control unit adapted to control operation of the robot, wherein the robot stabilizes the workpiece during the working process.

DESCRIPTION OF THE RELATED ART

Such a bending apparatus is known in the form of a creasing press from EP 0742054 A1. A metal plate is creased in the creasing press, with a stamp being pushed onto a pressing tool in order to deform the metal plate. A robot holds the metal plate during the creasing process and repositions it. The robot has a pivotable holder, which is mounted on three supports that are at right angles to one another and displaceable in the x, y and z directions, and which holder is pivotable through an angle. The embodiments of the printed therefore involve what is known as a Cartesian robot. For repositioning, the publication puts forward three motion equations describing the x and y adjustment and the holder pivot angle of the Cartesian robot as a function of the position of the stamp of the creasing press. These motion equations are stored in a control device of the bending press, which means that the control device can define set values during operation to a CPU of the robot. This is referred to in the publication as "master-slave" control. The solution in EP 0742054 A1 is directed to a single, quite specific working process, namely the creasing of a metal plate. The equations are derived from mathematical analysis and complex geometric consideration in precisely the Cartesian coordinate system according to which the supports of the robot move. Moreover, the control device, for the purpose of controlling the CPU of the robot, needs to have knowledge of the internal data structure of the robot in order to be able to apply the correct definitions to the CPU of the robot. Detailed information about the internal control of the robot is therefore required.

EP 0554533 B1 and EP 2998041 A1 describe a bending apparatus for rod-shaped or tubular workpieces in which a bending machine, which has a bending head designed to bend the workpiece in a working process, and a robot, which has a motor adjusted multi-articulated arm with a gripping end, are combined. The robot holds the workpiece during the working process. The control of the two components 'bending machine' and 'robot' is not considered.

EP 3266529 A1 discloses a bending machine that has a control unit. A further device is a robot that has an independent control unit. The control units of the two devices 'bending machine' and 'robot' are coordinated with one another during operation. The text refers to "interlocking manner". There is no provision for master-slave control; instead, programs are generated for both control units on a joint data basis.

The master-slave control of the robot by the bending machine in the form of a creasing press, as present in the generic prior art of EP 0742054 A1, achieves a particularly high level of synchronism for the two devices. However, this requires complex mathematical analysis in order to ascertain the equations according to which the robot is controlled. The movements of the robots in the generic prior art also need to be exactly concordant with the x and y axes and the pivot angle that was used in the mathematical analysis. The creasing press and the Cartesian robot have the same coordinate system. This combination of devices is therefore tied to a very limited application, namely the creasing of metal plates. Moreover, the CPU of the robot needs to be actuated directly, which necessitates information about the internal structure of said CPU.

SUMMARY OF THE INVENTION

The invention is therefore based on the object of developing a system of the mentioned generic type having master-slave control of the robot by a bending machine such that a greater degree of freedom of application and the machining of rod-shaped or tubular workpieces are possible.

The invention is defined in claim 1. The dependent claims relate to preferred developments.

The bending apparatus for bending a rod-shaped or tubular workpiece comprises a bending machine and a robot. The bending apparatus has a bending device, which is provided as a bending head that bends rod-shaped or tubular workpieces. The bending machine has the bending head for cold reshaping. The bending head is designed to bend the workpiece in a working process. Furthermore, the bending machine has a control device that controls the operation of the bending machine. The robot is provided as a motor adjusted multi-articulated arm having a gripping end. The gripping end is designed to grip and hold the workpiece, wherein the gripping end of the robot is provided as a gripping tool for the rod-shaped or tubular workpiece and, referenced to the workpiece that is held, has a center. Furthermore, the robot has a control unit designed for controlling the operation of the robot. The working process carried out on the workpiece comprises the working process, in which the bending head bends the workpiece.

The working process and the working process are preceded by the introduction of the workpiece into the bending head by the robot. During the working process, the robot stabilizes and orients the workpiece. Depending on the type of working process, the robot holds the workpiece or ensures repositioning. After the working process, the robot removes the workpiece from the bending head.

The control device of the bending machine is designed to create a bending program, and to this end comprises a programming system. The bending program comprises multiple working bends for the rod-shaped or tubular workpiece, the bends being spaced at intervals from one another and have each a defined bending plane, e.g. being made in individual bending planes. For the bending program, the programming system generates target values for axes of the bending machine and for the robot. Normally, the user enters the intervals between the bends and the orientation of the bending plane(s) into the programming system. The bending program controls the bending machine and the robot during the working process.

During the working process the control unit of the robot is switched to a slave mode. In said slave mode, the control unit receives control commands from the control device of the bending machine and converts them into the actuation of the motor adjusted multi-articulated arm and the gripping end.

The control commands preferably do not directly stipulate the position, alignment and speed of movement of the gripping end, but rather the angulation of the robot joints.

During the working process the control device continually outputs target settings for the motor adjusted multi-articulated arm and the gripping end for the control unit of the robot, which control unit is in the slave mode.

In this manner the control device of the bending machine controls not only the bending machine but also the robot, indirectly via the control unit. Under the control of the bending machine and the control unit switched to the slave mode, the robot introduces the workpiece into the bending head, stabilizes said workpiece during the deformation process and repositions it and removes it from the bending head after the working process.

The control device of the bending machine therefore ultimately undertakes control of the robot, but without the control unit of the robot being deactivated completely. Instead, the control device stipulates details relating to the setting for the motor adjusted multi-articulated arm and/or the gripping end for the control unit of the robot. In particular, the control device can stipulate the setting of the arm and/or the orientation (in particular alignment) of the center of the gripping tool directly.

The control unit of the robot does not execute a separate program in the slave mode, but rather merely converts the definitions of the control device of the bending machine into applicable actuation of the motors that adjust the multi-articulated arm and of the gripping end. Since the bending machine and the robot are ultimately controlled by a jointly controlling entity, namely the control device of the bending machine, the synchronism and reciprocal coordination of the movements of the robot and the bending machine are, surprisingly, unproblematic, and the bending result is improved thereby.

A working process is understood to mean, among other things, the sequence of supplying the workpiece to the bending head through the, possibly multiple, bending reshaping(s) of the workpiece in the bending head and the removal of the reshaped workpiece from the bending head. The working process can also be complemented by the gripping of a blank from a stock of blanks and/or the depositing of the machined workpiece on an output stack. Knowledge of the internal design of the robot control, as in EP 0742054 A1, is no longer necessary.

The approach achieves the advantage that the programming can be facilitated. To this end, there is provision for the control device to have a programming system for creating the bending program. From the bending program, which may be stipulated in the form of the aforementioned data, for example, the programming system, in a first alternative, generates definitions for target values for axes of the bending machine and axes or coordinates of the robot. The central control of the bending machine and the robot by the control device of the bending machine can be realized particularly easily if the bending machine and the robot refer to a coordinate or axis system that is standard for both machines. There is therefore provision, for the first alternative, for the control device of the bending machine to perform an axis transformation in which it uses firstly t mathematical relationship between rotation angles of axes of the multi-articulated arm and secondly a position of the center of the gripping end. This center is also referred to as the "tool center point" and permits the orientation of a workpiece held by the robot to be specified accurately. In a second alternative, the programming system generates definitions for the center of the gripping tool referenced to the workpiece that is held.

In this manner it is not necessary for an operator of the bending apparatus to deal with different programming interfaces for the bending machine, on the one hand, and the robot, on the other. At the same time, errors in the coordination of the bending machine and the robot are avoided. Moreover, the multi-articulated arm and the programming system by means of which the bending program is stipulated allow simple tuning of almost any bending result and thus provide great freedom of application.

In a more preferred configuration, the control unit of the robot, in the slave mode, feeds-back actual values for the setting of the motor adjusted multi-articulated arm and the gripping end to the control device of the bending machine. In this manner, correct operation and in particular correct interaction of the bending machine and the robot can readily be checked in the control unit.

The central position of the control device of the bending machine allows, in embodiments, axes of the bending machine to be jointly interpolated with the center of the gripping end as provided in Cartesian coordinates. This considerably reduces the level of programming complexity for the control device of the bending machine. EP 0742054 A1 required the robot axes and the Cartesian axes of the bending press to be identical.

It goes without saying that the bending machine can also have more than one bending head and/or the bending apparatus can have two or more robots, which cooperate with one another in the working process and each have a motor adjusted multi-articulated arm, a gripping end and a control unit. The control device, which is furthermore provided centrally, responsible for all of the bending machines is then connected to the respective control units of the robots, which run in the slave mode and receive control commands from the control device of the bending machine.

For the working process, which is usually cold reshaping of the workpiece, the workpiece is oriented by the robot. In this manner, the working process comprising multiple bends, that is to say a sequence of bending working processes, results in the intervals between the bends and the stipulation, e.g. rotation of the bending planes, being set by the robot.

In the case of working processes in which the workpiece is drawn in by the bending head, the robot, during its stabilization, permits this drawing-in or repositions the workpiece as appropriate. In the case of working processes that do not result in the workpiece being drawn in, for example in the case of bending heads that operate on the basis of the unrolling working process, the robot holds on to the workpiece for the purpose of stabilization.

It goes without saying that the features cited above and those yet to be explained below can be used not only in the indicated combinations but also in other combinations or on their own without departing from the framework of the present invention.

The invention is explained in even greater detail below on the basis of exemplary embodiments with reference to the accompanying drawings, which also disclose features essential to the invention. These exemplary embodiments are only illustrative and should not be construed as restrictive. By way of example, a description of an exemplary embodiment with a multiplicity of elements or components should not be construed as meaning that all of these elements or components are necessary for implementation. Rather, other exemplary embodiments can also contain alternative elements and components, fewer elements or components or additional elements or components. Elements or components of different exemplary embodiments can be combined with one another, unless stated otherwise. Modifications and variations, which are described for one of the exemplary embodiments, can also be applicable to other exemplary embodiments. To avoid repetitions, the same or corresponding elements in different figures are denoted by the same reference signs and are not explained multiple times.

DETAILED DESCRIPTION OF THE INVENTION

Figure 1:
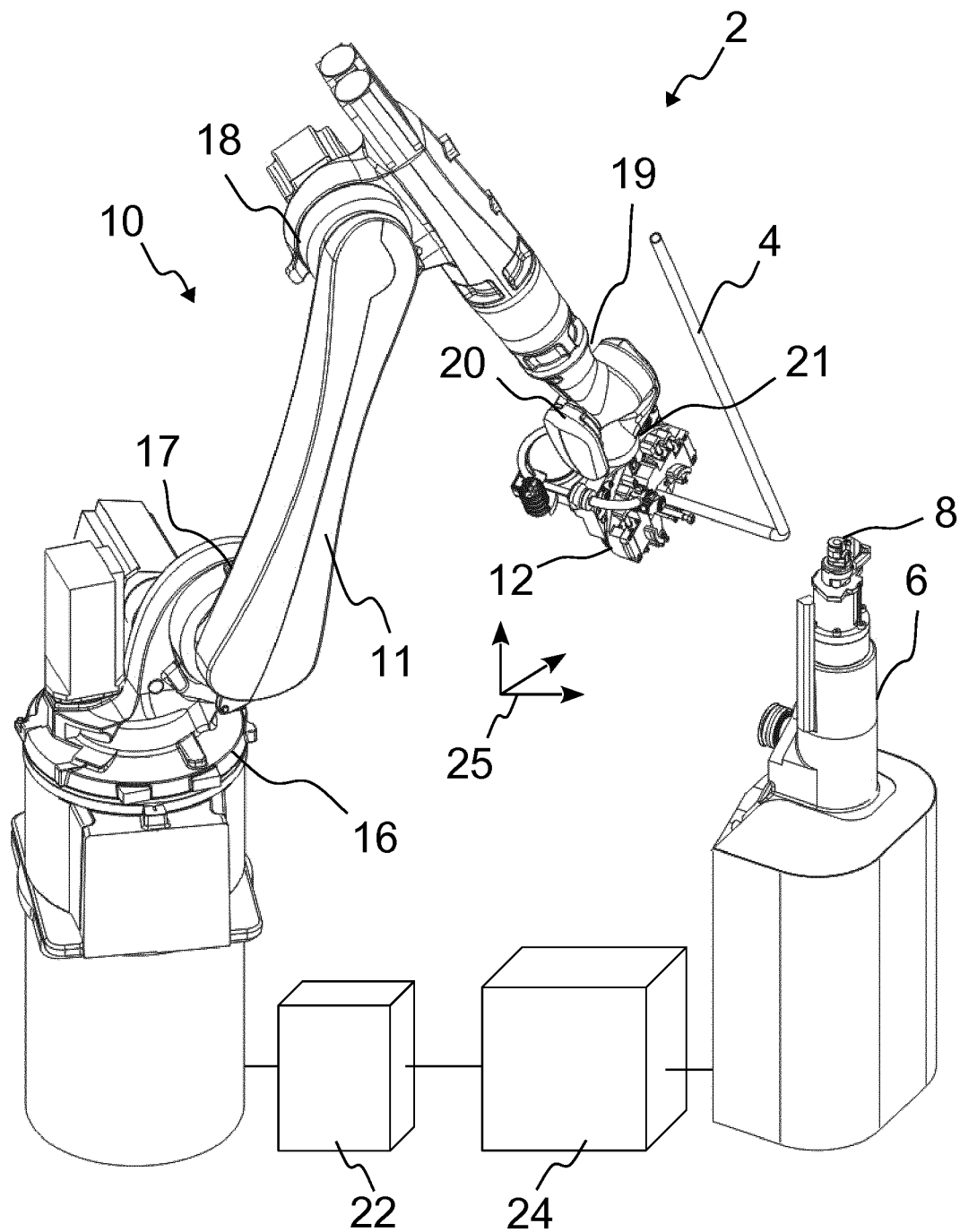
FIG. 1 shows a depiction of a bending apparatus for bending rod-shaped or tubular workpieces and FIG. 2 shows a block diagram of the control of the bending apparatus in FIG. 1.

FIG. 1 shows a bending apparatus 2, designed to bend a workpiece 4, which is tubular in this instance. The bending apparatus 2 comprises a bending machine 6 having a bending head 8. Such bending machines are known in principle to a person skilled in the art, for example from the cited EP 3266529 A1. When the workpiece 4 is inserted on the bending head 8, the latter performs a bending working process for the workpiece 4. The workpiece 4 is supplied by a robot 10, inserted into the bending head 8 and held during the working process. To this end, the robot 10 has a gripping tool 12 that grips and holds the workpiece 4, in particular while it is machined by the bending head 8. The bending head 8 in FIG. 1 operates on the basis of the unrolling working process. Unrolling bending does not involve the workpiece 4 being drawn in. The gripping tool 12 and the robot 10 therefore hold the workpiece 4 during the working process. In other embodiments, the working process can require the workpiece 4 to be drawn in on the bending head 8. For these cases, the robot 10 uses its gripping tool 12 to reposition the workpiece 4 by virtue of the gripping tool 12 following the movement of the workpiece 4 during the working process. In both variants, the gripping tool 12 of the robot 10 stabilizes the workpiece during the working process. Furthermore, the robot 10 orients the workpiece for the multiple bends. Appropriate alignment of the gripping tool 12 sets the intervals between the bends and the rotation of the bending planes relative to one another. In the case of 2D workpieces, the bending planes remain unchanged; the same bending plane is therefore stipulated for all bends.

The robot 10 is a multi-articulated arm robot having a robot arm 11 that has a multiplicity of rotary joints 16-21. A robot of this type is available from Kuka AG, for example. In the present case, a robot 10 having six axes is involved. The number of axes is purely exemplary, however. The robot arm 11 is adjustable at the rotary joints 16-21 by electric motors, which means that the gripping tool 12 is adjustable in three dimensions in space, as is the orientation of the workpiece 4 for the bending cold reshaping operations therefore.

The robot is a multipurpose robot and therefore has a separate control unit 22 allowing the robot 10 to be controlled freely. If the robot 10 is operated independently, the control unit 22 would have an appropriate program stored that controls the operation of the robot 10. This independent operation quite consciously does not take place, however. The bending machine 6 has a control device 24 that controls the operation of the bending machine 6 and in particular the action of the bending head 8. The control unit 22 and the control device 24 are connected to the robot 10 or bending machine 6 that they control via lines, which are not designated more specifically. They are also connected to one another for control purposes in order to ensure the coordinated operation of the robot 10 and the bending machine 6 during the working process on the workpiece 4. The control device 24 is hierarchically superordinate to the control unit 22 in this instance.

Figure 2:
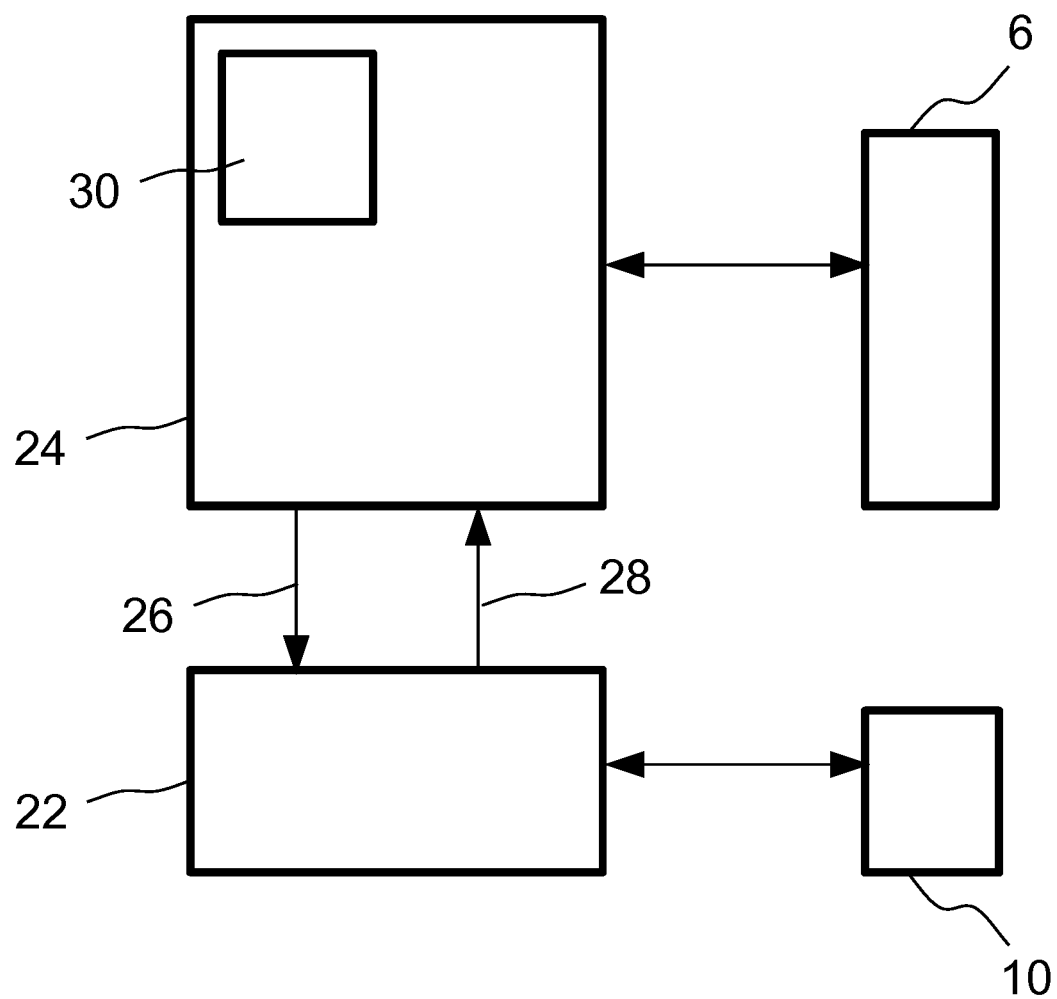

The interaction of the control unit 22 and the control device 24 is depicted schematically in FIG. 2. The control device 24 is connected to the control unit 22 by means of bidirectional data interchange. The control device 24 sends stipulation data 26 to the control unit 22 and receives confirmation data 28 therefrom. It also comprises a programming device 30.

The movements to be carried out by the robot 10 are not stored in the control unit 22 in the form of a control program, but rather are programmed completely in the control device 24 of the bending machine 6, for example by means of the programming device 30. To machine a workpiece 4, the control unit 22, which would be inherently and independently capable of independent control of the robot 10, runs in a slave mode, in which it merely receives stipulation data 26 from the control device 24 and sets the drives at the rotary joints 16-21 in accordance with these stipulation data 26. The control device 24, which is provided as a CNC controller in the exemplary embodiment, interprets the bending program entered for it and generates setpoint data both for the axes of the bending machine 6 and for the robot. The target values for the robot are routed as stipulation data 26 to the control unit 22, which sets the drives at the rotary joints 16-21 and the gripping tool 12 as appropriate.

In a first variant embodiment the stipulation data 26 indicate the orientation of a tool center point of the gripping tool 12 in a coordinate system 25. The tool center point is the center of the gripping tool 12 referenced to the workpiece 4 that is held. In this manner, the tool center point of the gripping tool 12 of the robot 10 can be moved in the Cartesian coordinate system 25. The stipulation data 26 contain the setpoint location and the setpoint orientation for the tool center point of the gripping tool 12.

In a second variant embodiment the stipulation data 26 indicate the setting of the axes of the robot 10. For this purpose, the control device 24 performs an axis transformation that produces a mathematical relationship between rotation angles of the robot axes and the position of the tool center point on the robot 10. This axis transformation can be performed in the control device 24 or else in the control unit 22.

It is fundamental for the stipulation data 26 in both variant embodiments that the control device 24 can interpolate the axes of the bending machine 6 with the Cartesian coordinate system 25 for the tool center point of the gripping tool 12 of the robot 10. In this manner, the robot 10 can e.g. hold or suitably reposition the workpiece 4 on the bending head 8 during bending and perform the change of orientation between multiple working processes.

Since the control is ultimately stipulated by the control device 24, and the control unit 22 is only in the slave mode, optimum synchronism of the movement of the robot 10 and the bending machine 6 is automatically produced and the accuracy with which the workpiece 4 is bent is increased.

Further, the programming device 30 is not used to produce a specific robot control program in the syntax stipulated by the control unit 22, but rather the robot axes are programmed in exactly the same manner as the axes of the bending machine 6. It is possible both to program the individual rotational axes of the robot 10 and to program the robot in the coordinate system 25. The selection can be made in this instance on the basis of simplicity of the programming or prior knowledge of the operator. In both cases, he requires no knowledge of the programming interface of the robot 10.

The invention claimed is:

1. A bending apparatus for bending a rod-shaped or tubular workpiece into a multiple-bend geometry in a working process including a plurality of individual workings, the workpiece being bent to a separate respective bend during each individual working, the apparatus comprising:
   a bending machine comprising a bending head for bending the workpiece, wherein position and status of the bending head are defined relative to a plurality of bending machine axes and wherein the bending head is configured for individual workings either of an unrolling working type or of a drawing-in working type;
   a robot comprising:
      a multi-articulated arm comprising an arm end and several robot arm axes which are individually adjustable by at least one motor regarding rotation angles of the robot arm axes;
      a gripping toot mounted to the arm end and, thus, moved by the arm, and configured to grip and hold the rod-shaped or tubular workpiece, the gripping tool having a tool center referenced to the workpiece that is held by the gripping tool; and
      a robot control unit adapted to control the arm regarding the rotational angles of the robot arm axes,
   a CNC programmable bending machine controller, the bending machine controller controlling operation of the bending, machine, wherein the bending machine controller is adapted to receive user programming input device and generates a bending program that defines a sequence of the individual workings with the separate bends being located at specified spacings from each other and being located in a plurality of different bending planes, and wherein the user programming input includes specifying a distance between successive ones of the separate bends and the orientation of the bending plane corresponding to each bend;
   wherein the bending machine controller generates bending machine target values for the bending machine axes and robot arm target values for the robot arm axes using the bending program and performs an axis transformation that uses a mathematical relationship between the rotation angles of the robot arm axes and the position of the tool center, and
   wherein during the working process, the robot control unit runs in a slave mode, in which the robot control unit receives control commands and adjusts the rotational angles of the robot arm axes according to the control commands, and the bending machine controller is configured to indirectly control the robot during the working process by providing the robot arm target values as control commands to the robot control unit running in the slave mode, such that the gripping tool stabilizes the workpiece during the sequence of the individual workings producing the multiple-bend geometry.

2. The bending apparatus as claimed in claim 1, wherein, in the slave mode, the robot control unit feeds-back actual values of the robot arm axes and of the gripping tool to the bending machine controller.

3. The bending apparatus as claimed in claim 1, wherein the robot arm axes and the bending machine axes have different coordinate systems and the bending machine controller interpolates the coordinate system of the robot arm axes with the coordinate system of the bending machine axes.

4. The bending apparatus as claimed in claim 1, comprising at least one second robot comprising a second multi-articulated arm comprising an second arm end and several second robot arm axes which are individually adjustable by at least one second motor regarding second rotation angles of the second robot arm axes, a second gripping tool mounted to the second arm end and, thus, moved by the second arm, and adapted to grip and hold the rod-shaped or tubular workpiece, the second gripping tool having a second tool center referenced to the workpiece that is held by the second gripping tool, and a second robot control unit adapted to control operation of the second arm, wherein the second robot control unit is also switched to the slave mode during the working process and receives the control commands from the bending machine controller such that the robot and the second robot cooperate in the working process.

5. The bending apparatus as claimed in claim 1, wherein the gripping tool repositions the workpiece during the working process.

6. The bending apparatus as claimed in claim 1, wherein the bending machine controller is configured to control the robot to at least one of the following: inserting the workpiece into the bending head prior to the working process and removing the workpiece from the bending head after the working process is finished.

7. The bending apparatus as claimed in claim 1, wherein the robot control unit comprises an independent mode of operation, in which the robot control unit controls the multi-articulated arm Without receiving control commands form the bending machine controller.

8. The bending apparatus as claimed in claim 1, wherein the robot orients the workpiece for the sequence of individual workings and sets the spacings and the bending planes of the bends by means of an adjustment of the gripping tool.

9. A method for bending a rod-shaped or tubular workpiece into a multiple-bend geometry in a working process including a plurality of individual workings, the workpiece being bent to a separate respective bend during each individual working, the method comprising the steps of:
   providing a bending machine comprising a bending head for bending the workpiece and using bending machine axes to define position and status of the bending and wherein the bending head is configured for individual workings either of an unrolling working type or of a drawing-in working type;
   providing a CNC programmable bending machine controller, the bending machine controller controlling operation of the bending machine, Wherein the bending machine controller is adapted to receive user programming input and generates a bending program that defines a sequence of the individual workings With the separate bends being located at specified spacings from each other and being located in a plurality of different bending planes, and wherein the user programming input includes specifying a distance between successive ones of the separate bends and specifying the orientation of the bending plane corresponding to each bend;

providing a robot comprising:
- a multi-articulated arm comprising an arm end and several robot arm axes Which are individually adjustable by at least one motor regarding rotation angles of the robot arm axes;
- a gripping tool mounted to the arm end and, thus, moved by the arm, and configured to grip and hold the rod-shaped or tubular workpiece, the gripping tool having a tool center referenced to the workpiece that is held by the gripping tool; and
- a robot control unit adapted to control the arm regarding the rotational angles of the robot arm axes;
- generating bending machine target values for the betiding machine axes and robot arm target values for the robot arm axes using the bending program and performing an axis transformation using a mathematical relationship between the rotation angles of the robot arm axes and the position of the tool center;
- operating the robot control unit in a slave mode, in which the robot control unit receives control commands from the bending machine controller and adjusts the rotational angles of the robot arm axes according to the control commands; and
- performing the working process according to the bending program, wherein the bending machine controller indirectly controls the robot by providing the robot arm target values as the control commands to the robot control unit running in the slave mode, such that the gripping tool stabilizes the workpiece during the sequence of the individual workings producing the multiple-bend geometry.

10. The method as claimed in claim 9, wherein the method includes feeding back actual values of the robot arm axes and of the gripping tool to the bending machine controller when the robot control unit is in the slave mode.

11. The method as claimed in claim 9, wherein the robot arm axes and the bending machine axes have different coordinate systems and the method includes interpolating the coordinate system of the robot arm axes with the coordinate system of the bending machine axes using the bending machine controller.

12. The method as claimed in claim 9, further including a step of providing at least one second robot comprising a second multi-articulated arm comprising an second arm end and several second robot arm axes which are individually adjustable by at least one second motor regarding second rotation angles of the second robot arm axes, a second gripping tool mounted to the second arm end and, thus, moved by the second arm, and adapted to grip and hold the rod-shaped or tubular workpiece, the second gripping tool having a second tool center referenced to the workpiece that is held by the second gripping tool, and a second robot control unit adapted to control operation of the second arm, wherein the second robot control unit is also switched to the slave mode during the working process and receives the control commands from the bending machine controller such that the robot and the second robot cooperate in the working process.

13. The method as claimed in claim 9, further comprising repositioning the workpiece during the working process with the gripping tool.

14. The method as claimed in claim 9, wherein the method includes controlling the robot to perform at least one of the following: inserting the workpiece into the bending head prior to the working process; and removing the workpiece from the bending head after the working process is finished.

15. The method as claimed in claim 9, wherein the robot control unit comprises an independent mode of operation, and the method includes controlling, with the robot control unit, the multi-articulated arm without receiving control commands from the bending machine controller.

16. The method as claimed in claim 9, wherein the method includes orienting, with the robot, the workpiece for the sequence of the individual workings and setting the spacings and the bending planes of the bends by means of an adjustment of the gripping tool.

* * * * *